United States Patent Office 3,472,677
Patented Oct. 14, 1969

3,472,677
METHOD FOR APPLYING LOW DENSITY CARBON COATINGS
Hans Beutler, Oak Ridge, Tenn., and Marshall C. Payne, Cincinnati, Ohio, assignors to the United States of America as represented by the United States Atomic Energy Commission
Filed Mar. 29, 1966, Ser. No. 538,923
Int. Cl. B44d 1/02, 1/097
U.S. Cl. 117—46                    2 Claims

ABSTRACT OF THE DISCLOSURE

An improved method for depositing low density, highly porous carbon coating on reactor fuel particles by thermal decomposition of acetylene gas at elevated temperatures is provided comprising fluidizing the fuel particle with undiluted acetylene gas at a gas pressure of substantially 760 torr and at a temperature within the range of 1100° C. to 1250° C.

---

The invention described herein was made in the course of, or under, a contract with the U.S. Atomic Energy Commission. This invention relates generally to thermochemical vapor deposition methods for coating articles and more particularly to methods for applying low density carbon coatings to nuclear fuel particles.

In the development of high temperature nuclear reactor systems, the use of dispersion-type ceramic fuel particles has proven especially useful. In order to provide a means for fission gas retention, an impervious coating of pyrolytic carbon is deposited about the fuel particles. While fuel particles which have a single layer of pyrolytic carbon about the fuel particles as a coating have been widely investigated, experimentation has indicated that multiple carbon coating (i.e., duplex, etc.) offer improved fission gas retention, as well as result in fewer fuel failures due to coating break-down. Where these multiple carbon coatings have been employed, the first layer has generally consisted of a low density, highly porous coating followed by one or more high density, impervious, carbon outer coatings. The use of such low density intermediate carbon coatings has been found to be especially attractive in that the coating not only provides space for fission gas retention, but also provides a spongy area which acts to absorb stresses between the fuel particle and the coating. This has been found, for example, to be especially beneficial in reducing fission fragment recoil damage to the carbon coatings, thus reducing fuel failures via ruptured coatings.

In applying these low density carbon coatings, a thermally-decomposable hydrocarbon gas is generally cracked under conditions such that a low density, porous carbon deposit develops on the fuel particles. These low density, porous carbon coatings have been postulated as being formed by gas-phase condensation of the carbon to droplets or by formation by gas phase nucleation of soot particles which are incorporated into the deposit. While some soot formation is desirable in such processes for preparing low-density, porous carbon coatings, soot particles which are not incorporated into the carbon coatings but pass through the reaction zone and are deposited on the walls of the coating apparatus are highly undesirable, resulting in frequent shut-down and maintenance of the equipment.

While no definitive criteria have been established for such low density porous coatings, it is generally known that as the density of the intermediate layer approaches that of the outer layer the advantages and benefits attained with multi-layed coatings are severely diminished. Thus, it is highly desirable to conduct such processes wherein acceptable deposits may be with minimum densities obtainable. In this respect densities achieved below 1.0 gram/cc. are preferred, with the lower the better.

A number of high temperature methods for preparing low density, porous carbon coatings has been proposed and, while there was no mention in the literature of the sooting problem, when applicants conducted coating operations in accordance to the previous methods voluminous quantities of soot were encountered which seriously hampered the coating process by requiring frequent maintenance of the coating apparatus. Additionally, serious problems were encountered by pluggage at the inlet line due to premature cracking of the acetylene gas within the inlet lines, requiring frequent shutdowns and maintenance of the coating apparatus. It would therefore seem highly desirable to provide a coating process for preparing low density porous carbon coatings over a wide range of operable densities without deleterious excessive soot formation and/or pluggage in the coating apparatus.

With these difficulties in mind, it is a primary object of this invention to provide an improved method for depositing low density carbon coatings on objects.

Another object is to provide an improved deposition method for preparing low density porous carbon coated objects wherein soot formation within the coating apparatus is minimized.

Still another object is to provide an improved method for carrying out a low density, porous carbon coating process wherein maintenance of process equipment is minimized.

A further object is to provide an improved method for preparing low density, porous carbon coated articles having coating densities which vary over a wide range of operable densities.

Other objects and advantages will become apparent as the description proceeds and when read in light of the accompanying drawings, in which.

Figure 1:
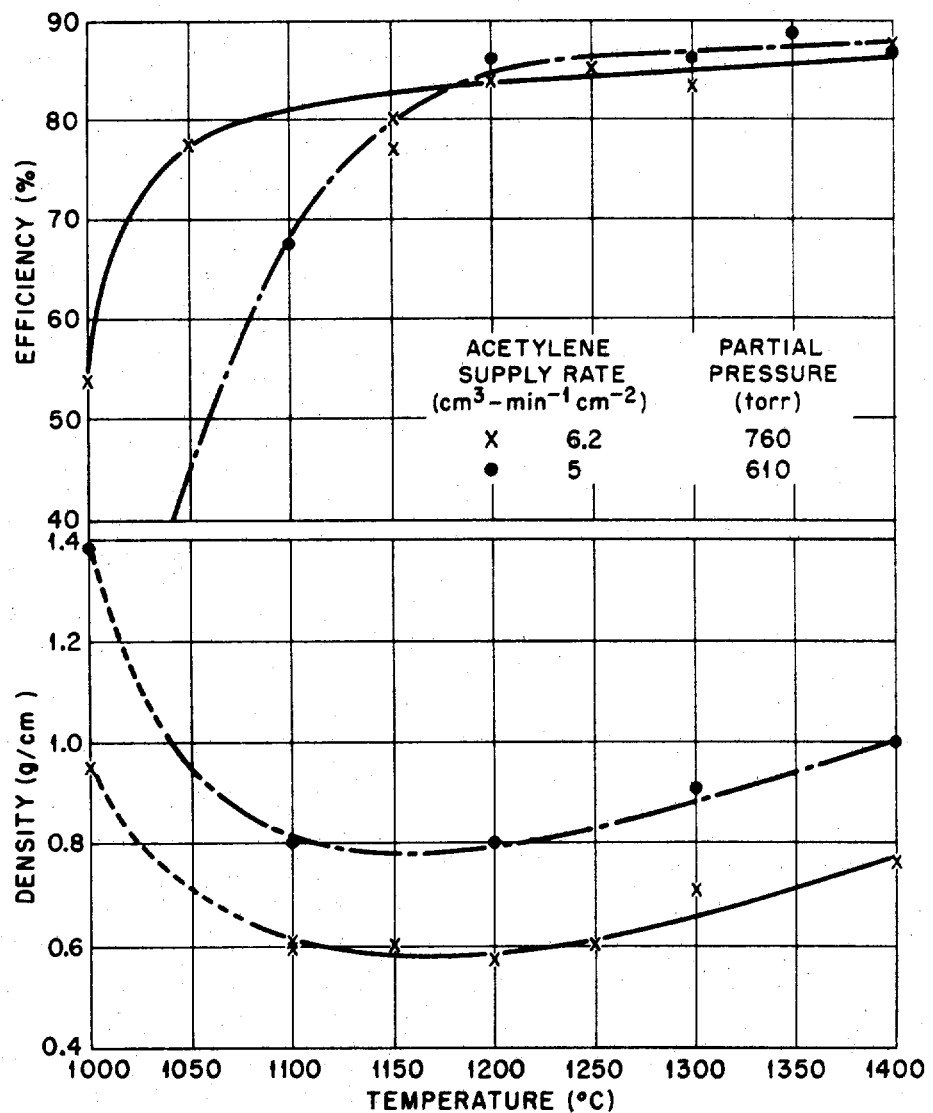
FIG. 1 is a plot of density vs. temperature for 460μ diameter thorium oxide particles coated with porous carbon coating deposited with undiluted acetylene gas which is injected at room temperature into the fluidized bed reaction zone. Also, acetylene gas efficiencies are shown vs. temperature.

Briefly stated, this invention comprises, in a method for preparing coated reactor fuel particles having a low density, highly porous carbon coating wherein said coating is deposited by thermal decomposition of acetylene gas at elevated temperatures, the improvement comprising fluidizing said particles with a fluidizing gas comprising undiluted acetylene gas at a gas pressure of about 760 torr and at a temperature within the range of 1100° C. to 1250° C. By utilizing the coating gas of substantially 100% acetylene gas (total gas pressure—760 torr) and carrying out the coating operation at temperatures within the range of from 1100° C. to 1250° C., applicants have discovered unexpectedly that adverse pluggage of the inlet gas line and excessive soot formation within the coating apparatus are effectively eliminated. Of significant importance, it has been found that the resulting densities of the carbon coatings were at a minimum and were found to range from about 0.6 to 1.0 gram/cm.$^3$ with a mercury porosity of about 65%. As may be seen from FIG. 1, the coating operation was highly efficient, resulting in acetylene gas efficiencies above about 80% for 460$\mu$ diameter thorium oxide particles.

The temperature in which the thermal decomposition is conducted is critical and must be at least 1100° C. and should not exceed 1250° C. At temperatures below about 1100° C. voluminous quantities of soot were generated during the coating operation and plated out in the walls of the fluidized bed reactor above the reaction zone. When the coating operation was carried out at temperatures above 1250° C., acetylene gas cracked prematurely in the gas inlet line, causing pluggage and disrupted the whole coating operation.

In carrying out the coating operation the particles, such as dense thorium oxide particles, are charged to a fluidized bed reactor and fluidized by passage of helium gas into the bottom of the reaction chamber of the reactor. After the particles have reached an equilibrium coating temperature, the coating operation was initiated by passing undiluted acetylene gas into the bottom of the fluidized bed reactor. Applicants has found that in order to prepare suitable low density carbon coated particles without the attendant twin problems of sooting and gas pluggage encountered in previous practice, the coating gas must comprise undiluted acetylene gas and must be supplied at a maximum rate. Unlike previous practices which employed a coating gas comprising predominantly a diluent such as helium with a minor portion of acetylene, applicants have found that low density coated particles can only be prepared without these problems by employing undiluted acetylene gas at a maximum supply rate. It will be appreciated here that the maximum supply rate of the acetylene gas will be limited to that flow rate of gas which is required to maintain a proper fluidization of the charge of particles within the fluidized bed reactor. Furthermore, for different charges and reaction chamber geometries the maximum supply rate, i.e., the fluidization flow rate, will vary widely. Where, for example, a charge of 50 grams of 460$\mu$ diameter thoria particles is employed, a fluidization velocity of 4 liters/minute was used and found to be quite suitable.

The coating time is not critical and may vary widely depending upon the coating thickness desired for the intermediate low density porous coating. Coating times ranging from 0.5 minute to 5 minutes have been employed, resulting in coating thickness ranging from around 25 microns to 120 microns.

Figure 2:
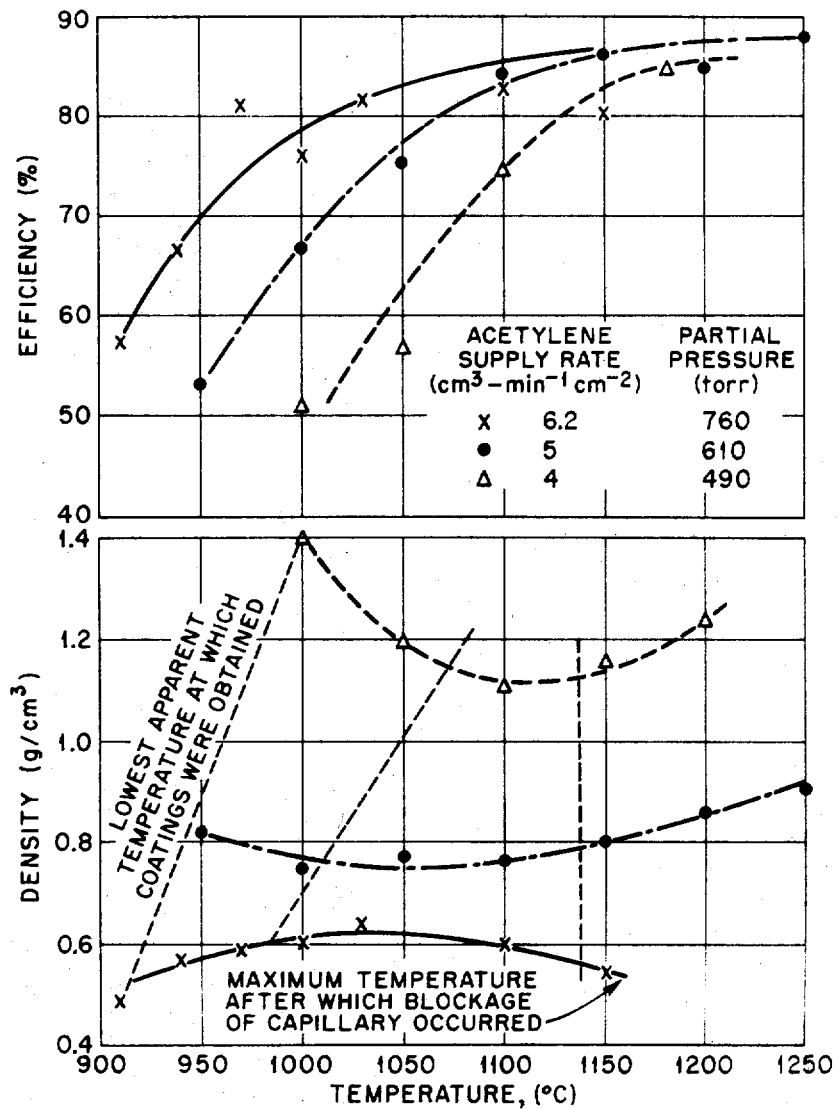
FIG. 2 is a plot of density vs. temperature for 460μ diameter thorium oxide particles coated with porous carbon coating deposited with undiluted acetylene gas injected into the reaction zone at a temperature just below its cracking temperature. Also shown are gas efficiencies vs. temperature.

While the process is carried out with the acetylene gas injected at room temperature, it has been found that preheating the coating gas prior to passing the coating gas into the lower section of the reactor has a pronounced effect upon the coating operations parameters. Referring to FIG. 2, it may be seen that where acetylene gas is preheated to a maximum, i.e., just below its cracking temperature, the coating operation may be carried out within a lower temperature range. Thus, when the coating operation was conducted with undiluted acetylene (total gas pressure—760 torr) at a temperature within the range of 1000° C. to 1150° C., coating densities of around 0.6 gram/cm.$^3$ were obtained with no adverse sooting or premature cracking of the acetylene gas in the inlet gas line. Further, it may be seen that the coating operation is equally as efficient as when conducted with no pre-heat, resulting in an acetylene gas efficiencies of about 80% for 460$\mu$ diameter thorium oxide particles.

The method by which the acetylene gas is pre-heated prior to entering the reaction zone may vary widely. In the present process the gas was passed through a 10" long with 0.1" base capillary tube which was disposed within the lower section of the fluidized bed reactor. In the coating runs where the acetylene gas was at room temperature, the gas was injected directly into the reaction zone through a water-cooled injector. Here, the acetylene gas passes from the water-cooled injector through the 10" long 0.1" capillary tube, then into the lower section of the reaction zone, thereby increasing the resident time of the gas within the heated section of the capillary and heating the gas to a temperature just below its cracking temperature.

Having thus described the invention in a general fashion, the following examples are provided to illustrate the quantitative aspects and procedures in greater detail.

EXAMPLE I

Fluidizing bed apparatus, consisting of a 1" ID graphite reaction chamber having a 36° included angle cone at the bottom with a water-cooled injector, was used for preparing low density porous carbon coated thorium oxide particles employing acetylene gas at various deposition temperatures. The fluidized bed reactor was heated through resistance heating of the graphite bed liner and the deposition temperatures measured by an optical pyrometer viewing the surface of the reaction tube at a distance of 2.1 in. from the orifice.

Several coating runs were made employing fifty-gram charge of 460$\mu$ diameter thorium oxide particles, respectively. The particles were placed in the reactor which was preheated to a deposition temperature and fluidized with helium at a flow rate of 4.0 liters/min. until an equilibrium temperature was reached. Then undiluted acetylene gas was passed into the reactor to initiate the coating. Due to the exothermic pyrolysis of the acetylene, the temperature within the reactor rose rapidly but did not adversely affect the coating operation. With the short coating time (less than 5 minutes) and in view of the large thermal lag of the reactor, it was not considered possible to achieve a constant temperature during the coating run. Thus, coating temperatures referred hereinto are equilibrium temperatures at the beginning of the run.

The deposition temperatures varied from 1000° C. to 1400° C. and the acetylene gas was supplied at rates of 6.2 and 5.0 cm.$^3$/min.-cm.$^2$ with gas pressures of 760 and 610 torr, respectively, and total gas flows of 4,000 cm.$^3$/min.

The coating phase was continued for periods of from 1–5 minutes and the deposition terminated. The coated particles were removed from the reactor and coating densities determined. The density of the porous coatings was calculated from these measurements of the carbon-to-particle weight ratio, which was obtained by removal by oxidation of coatings of a 3 gram sample in an alumina crucible at 900° C. in air for 5 hours, and coating-to-core volume ratio by measuring 50 particles randomly selected from microradiographs. The pore size distribution of the porous coatings was determined by mercury porosimetry. The results are shown in Table I below.

TABLE I.—DEPOSITION IN A GRADIENT FLUIDIZED BED

| Run | Coating temperature (°C) | Acetylene flow rate (cm.³/min.-cm.²) | Acetylene pressure [1] (torr) | Average deposition rate (μ/min.) | Coating thickness (μ) | Density gms./cm.³ | Efficiency (percent) |
|---|---|---|---|---|---|---|---|
| 1 | 1,000 | 6.2 | 760 | 40 | 79 | 0.95 | 53 |
| 2 | 1,100 | 6.2 | 760 | 65 | 65 | 0.60 | 77 |
| 3 | 1,100 | 6.2 | 760 | 56 | 112 | 0.60 | 80 |
| 4 | 1,150 | 6.2 | 760 | 72 | 72 | 0.60 | 76 |
| 5 | 1,200 | 6.2 | 760 | 53 | 107 | 0.55 | 85 |
| 6 | 1,250 | 6.2 | 760 | 72 | 72 | 0.60 | 86 |
| 7 | 1,300 | 6.2 | 760 | 50 | 99 | 0.70 | 84 |
| 8 | 1,400 | 6.2 | 760 | 50 | 100 | 0.75 | 88 |
| 9 | 1,000 | 5.0 | 610 | 5 | 10 | 1.4 | 16 |
| 10 | 1,100 | 5.0 | 610 | 32 | 65 | 0.8 | 68 |
| 11 | 1,200 | 5.0 | 610 | 41 | 82 | 0.8 | 87 |
| 12 | 1,300 | 5.0 | 610 | 35 | 70 | 0.9 | 86 |
| 13 | 1,400 | 5.0 | 610 | 39 | 68 | 1.0 | 89 |
| 14 | 1,500 | 5.0 | 610 | 34 | 69 | 0.9 | 87 |

[1] System at atmospheric pressure.

Good deposits of minimum densities were obtained at coating temperatures between 1100° C. and 1250° C. Below 1100° C. soot formation became prevalent and about 1250° C. pluggage of the inlet line occurred. While acceptable deposits were obtained within a range of temperature when the coating operation was carried out at a partial pressure and temperature (0.6 atmosphere and >1200° C.) of prior art practices, the densities were higher and not acceptable as an intermediate low density porous coating. Typical densities ranged from about 0.8 gram/cc. to above 1.0 gram/cc., whereas when the coating process was conducted in accordance to applicants discovery, densities of about 0.6 gram/cc. were achieved over the critical range of temperatures, viz., 1100° C.–1250° C.

EXAMPLE II

Fluidized bed apparatus, consisting of a1″ ID graphite reaction chamber having a 36° included angle core at the bottom with a 0.075 in. diameter 60 mm. capillary tube integral with the lower section of the reactor and connecting the water-cooled injector with the reaction chamber, was used for preparing low density porous carbon coated thorium oxide particles as in Example I. By this arrangement the coating gas (acetylene) was preheated to a temperature just below the deposition temperature.

Fifty-gram charges of 460μ diameter thorium oxide particles were employed for each run and undiluted acetylene was used as the fluidizing and decomposition gas.

Coating runs were made with acetylene pressures of 490, 610, and 760 torr with supply rates of 4.0, 5.0, and 6.2 cm.³/min.-cm.², respectively. Deposition temperatures ranged from 900° C. to 1250° C. The results are shown in Table II below.

TABLE II.—DEPOSITION IN AN ISOTHERMAL FLUIDIZED BED

| Run | Coating temperature (°C.) | Acetylene flow rate (cm.³/min.-cm.²) | Acetylene pressure [1] (torr) | Average deposition rate (μ/min.) | Coating thickness (μ) | Density gms./cm.³ | Efficiency (percent) |
|---|---|---|---|---|---|---|---|
| 1 | 910 | 6.2 | 760 | 59 | 59 | 0.48 | 57 |
| 2 | 940 | 6.2 | 760 | 56 | 110 | 0.56 | 67 |
| 3 | 970 | 6.2 | 760 | 56 | 110 | 0.68 | 81 |
| 4 | 1,000 | 6.2 | 760 | 55 | 83 | 0.60 | 76 |
| 5 | 1,030 | 6.2 | 760 | 52 | 100 | 0.63 | 82 |
| 6 | 1,100 | 6.2 | 760 | 60 | 90 | 0.60 | 83 |
| 7 | 1,150 | 6.2 | 760 | 63 | 94 | 0.54 | 80 |
| 8 | 1,250 | 6.2 | 760 | | | | |
| 9 | 900 | 5.0 | 610 | | | | |
| 10 | 950 | 5.0 | 610 | 27 | 53 | 0.82 | 53 |
| 11 | 1,000 | 5.0 | 610 | 37 | 75 | 0.75 | 67 |
| 12 | 1,050 | 5.0 | 610 | 37 | 75 | 0.77 | 75 |
| 13 | 1,100 | 5.0 | 610 | 40 | 79 | 0.77 | 84 |
| 14 | 1,150 | 5.0 | 610 | 40 | 80 | 0.80 | 86 |
| 15 | 1,200 | 5.0 | 610 | 37 | 74 | 0.86 | 85 |
| 16 | 1,250 | 5.0 | 610 | 37 | 73 | 0.90 | 88 |
| 17 | 900 | 4.0 | 490 | | | | |
| 18 | 1,000 | 4.0 | 490 | 12 | 37 | 1.40 | 51 |
| 19 | 1,050 | 4.0 | 490 | 16 | 47 | 1.20 | 57 |
| 20 | 1,100 | 4.0 | 490 | 26 | 77 | 1.11 | 75 |
| 21 | 1,501 | 4.0 | 490 | 22 | 65 | 1.16 | 84 |
| 22 | 1,200 | 4.0 | 490 | 21 | 63 | 1.24 | 85 |

[1] System at atmospheric pressure.

Good carbon deposits having densities of about 0.6 gram/cc. were obtained by employing preheated acetylene gas and coating temperatures between 900° and 1150° C. Deposition runs made in accordance with prior practices were found to be of a higher density than those attained when the coating operation was conducted in accordance with the present invention.

What is claimed is:

1. In a method for preparing coated reactor fuel particles having a low density, highly porous carbon coating having a density of about 0.6 to 1.0 gram per cubic centimeter wherein said coating is deposited by thermal decomposition of acetylene gas at elevated temperatures, the improvement comprising fluidizing said particles with a fluidizing gas comprising undiluted acetylene gas at a gas pressure of substantially 760 torr and at a temperature within the range of 1100° C. to 1250° C.

2. The method of claim 1 wherein said acetylene gas is supplied at a flow rate of 6.2 cm.$^3$/min.-cm.$^2$, said acetylene gas pressure is 760 torr and said deposition temperature 1200° C.

References Cited

UNITED STATES PATENTS

| 2,789,038 | 4/1957 | Bennett et al. | 117—46 X |
| 3,107,180 | 10/1953 | Diefendorf | 117—226 |
| 3,290,223 | 12/1966 | Blocher et al. | 117—100 X |
| 3,301,763 | 1/1967 | Beatty et al. | 176—91 X |
| 3,325,363 | 6/1967 | Goeddel et al. | 176—91 X |

OTHER REFERENCES

Oxley et al.: "Kinetics of Carbon Deposition in a Fluidized Bed," A.I. Ch. E. Journal, vol. 7, No. 3, September 1961, pp. 498–501.

WILLIAM D. MARTIN, Primary Examiner

MATHEW R. P. PERRONE, Jr., Assistant Examiner

U.S. Cl. X.R.

117—100; 176—67, 91